United States Patent
Hotokeishi

(10) Patent No.: US 8,428,482 B2
(45) Date of Patent: Apr. 23, 2013

(54) IMAGE FORMING APPARATUS AND COMPUTER READABLE MEDIUM

(75) Inventor: Kenichirou Hotokeishi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 333 days.

(21) Appl. No.: 12/881,590

(22) Filed: Sep. 14, 2010

(65) Prior Publication Data

US 2011/0217089 A1 Sep. 8, 2011

(30) Foreign Application Priority Data

Mar. 8, 2010 (JP) ................. 2010-050230

(51) Int. Cl.
*G03G 15/00* (2006.01)

(52) U.S. Cl.
USPC .............. 399/72; 358/1.15; 399/2; 399/301; 399/384

(58) Field of Classification Search ............ 399/72, 399/1, 2, 9, 38, 301, 384; 358/1.12, 1.15
See application file for complete search history.

(56) References Cited

U.S. PATENT DOCUMENTS

| | | | |
|---|---|---|---|
| 2002/0131804 A1* | 9/2002 | Nakazawa et al. | 400/580 |
| 2003/0165349 A1* | 9/2003 | Nakazawa | 399/384 |
| 2004/0057070 A1* | 3/2004 | Hanazato | 399/384 X |
| 2006/0039015 A1* | 2/2006 | Kageyama et al. | 358/1.15 X |
| 2009/0238619 A1* | 9/2009 | Aoki | 399/371 |
| 2011/0064498 A1* | 3/2011 | Takano | 399/384 |

FOREIGN PATENT DOCUMENTS

JP     A-2008-179453     8/2008

* cited by examiner

*Primary Examiner* — Sophia S Chen

(74) *Attorney, Agent, or Firm* — Oliff & Berridge, PLC

(57) ABSTRACT

An image forming apparatus includes a first acquiring unit, a determination unit, a second acquiring unit, and a notifying unit. The first acquiring unit acquires first settable region information on a plane-shaped recording medium in other image forming apparatus. The first settable region information indicates a first settable region on which a registration mark is settable. The determination unit determines a first region based on the first settable region information. The first region is a region on which the registration mark is formable in a cascade printing system including the image forming apparatus and the other image forming apparatus. The second acquiring unit acquires second settable region information on the plane-shaped recording medium. The second settable region information indicates a second settable region on which the registration mark is formable in the plane-shaped recording medium. The notifying unit provides invalidity information indicating the registration mark is possible invalid.

6 Claims, 4 Drawing Sheets

IMAGE FORMING APPARATUS AND COMPUTER READABLE MEDIUM

CROSS-REFERENCE TO RELATED APPLICATIONS

This application is based upon and claims priority under 35 USC 119 from Japanese Patent Application No. 2010-050230, filed Mar. 8, 2010.

BACKGROUND

Technical Field

This invention relates to an image forming apparatus and a computer readable medium.

SUMMARY OF THE INVENTION

According to an aspect of the invention, an image forming apparatus includes a first acquiring unit, a determination unit, a second acquiring unit, and a notifying unit. The first acquiring unit acquires first settable region information on a plane-shaped recording medium in other image forming apparatus. The first settable region information indicates a first settable region on which a registration mark is settable. The determination unit determines a first region based on the first settable region information. The first region is a region on which the registration mark is formable in a cascade printing system including the image forming apparatus and the other image forming apparatus. The second acquiring unit acquires second settable region information on the plane-shaped recording medium. The second settable region information indicates a second settable region on which the registration mark is formable in the plane-shaped recording medium. When the second region is not involved in the first region, the notifying unit provides invalidity information indicating the registration mark is possible invalid.

BRIEF DESCRIPTION OF THE DRAWINGS

Exemplary embodiments of the invention will be described in detail based on the following figures, wherein.

DETAILED DESCRIPTION (General Configuration)

Figure 1:
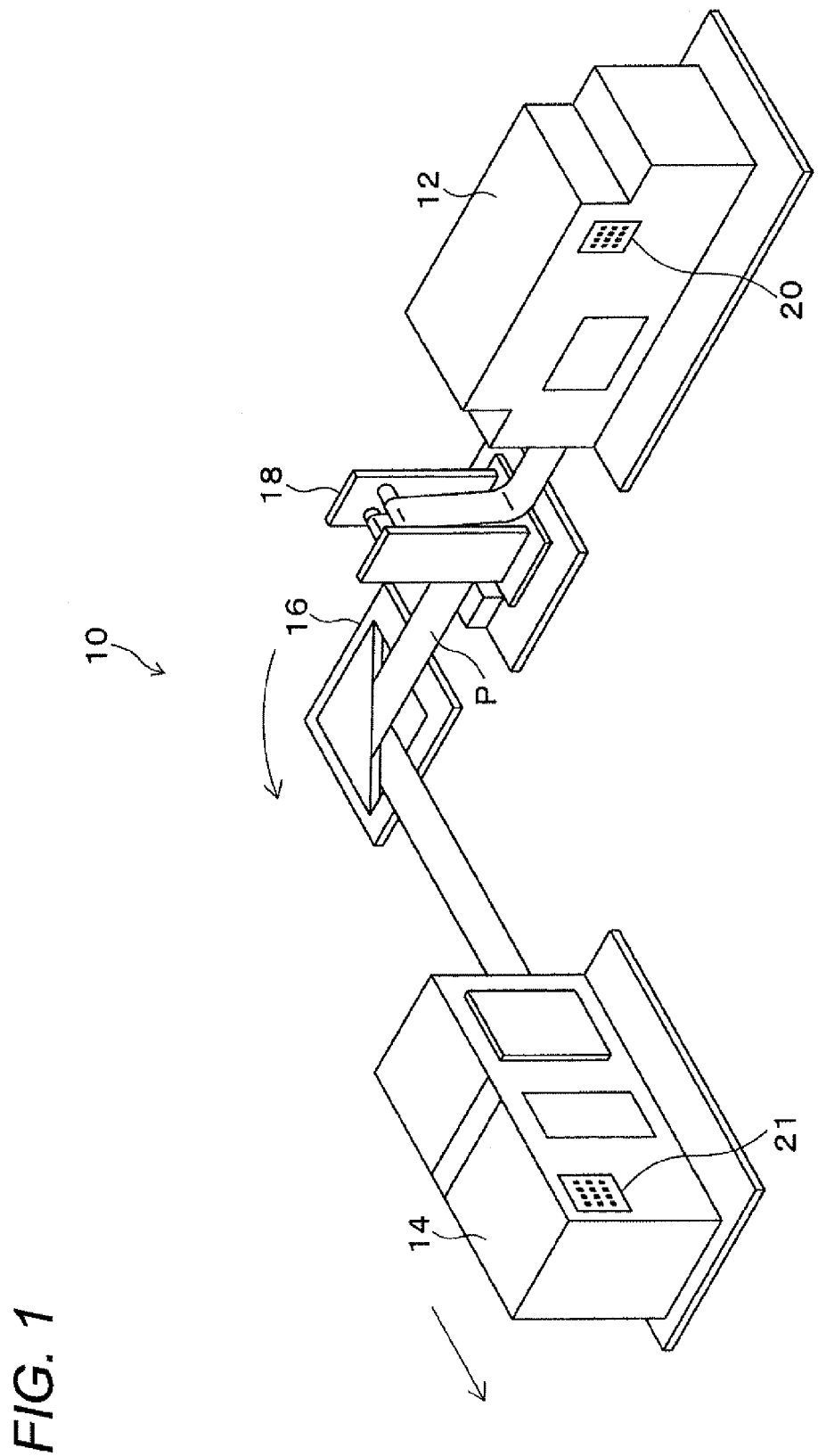
FIG. 1 is a perspective view of a cascade printing system of an exemplary embodiment of the invention.

An example using the invention will be discussed below. FIG. 1 shows an example of a cascade printing system using the invention. FIG. 1 shows a cascade printing system 10. The cascade printing system 10 has a function of forming an image on the surface and the back of a continuous sheet of paper of an example of a plane-shaped recording medium using image forming apparatus 12 and 14.

The image forming apparatus 12 is placed upstream in a sheet conveying path and stores a continuous sheet wound like a roll. A continuous sheet P with an image formed on one side in the image forming apparatus 12 is sent to a buffer device 18. The buffer device 18 bends the continuous sheet being conveyed in the apparatus and has a function of suppressing slack, twist, a floppy state, excessive tension, etc., of the continuous sheet P.

A surface and back inversion device 16 is placed downstream from the buffer device 18. The surface and back inversion device 16 inverts the surface and the back (up and down) of the continuous sheet and sends the sheet P to the downstream image forming apparatus 14. The image forming apparatus 14 prints on the side opposite to the side of the continuous sheet P printed in the image forming apparatus 12. The image forming apparatus 14 includes a winding mechanism for winding the continuous sheet where image forming terminates.

The image forming apparatus 12 and the image forming apparatus 14 form an image according to electrophotography. That is, although not shown in the figure, each of the image forming apparatus 12 and the image forming apparatus 14 includes a photoconductive drum, an exposure device for exposing for forming an electrostatic latent image on the photoconductive drum, a developing device for developing the electrostatic latent image in toner and forming a toner image, a transfer device for transferring the toner image to a continuous sheet, and a fixing device for fixing the toner image transferred onto the continuous sheet.

The image forming apparatus 12 includes a sheet feed device (sheet supply device) for storing a wound continuous sheet and feeding the continuous sheet while unwinding the continuous sheet. The image forming apparatus 14 includes a sheet winding device for winding the continuous sheet where an image is formed.

The image forming apparatus 12 and the image forming apparatus 14 are different models and differ in specification. The image forming apparatus 12 is a model that may use a continuous sheet formed with pin feed holes for conveying a sheet on both sides. The image forming apparatus 14 is a model not compatible with a continuous sheet formed with pin feed holes.

By the way, to print on both sides of a continuous sheet P in the cascade printing system 10 as illustrated in FIG. 1, a registration mark functioning as a mark is used to register the positions of surface and back images. That is, when an image is formed on a first side in the image forming apparatus 12, a registration mark is formed at the same time. When an image is formed on a second side in the image forming apparatus 14, the registration mark is optically detected by an optical sensor of the image forming apparatus 14 and an image is formed in the image forming apparatus 14 on the second side matched with the position of the image formed on the first side based on the registration mark.

The registration mark functions as display indicating position information in the continuous sheet P detected by the downstream image forming apparatus 14 and is formed in an inconspicuous location in the proximity of a margin of the continuous sheet or the like. The area in which the registration mark may be formed in the image forming apparatus 12 and the area in which the registration mark may be detected in the image forming apparatus 14 do not match. This is caused by whether or not the apparatus is compatible with a continuous sheet formed with pin feed holes.

This point is discussed below: A continuous sheet formed with pin feed holes and a continuous sheet formed with no pin feed holes differ in the dimension between the margin of the sheet and the image forming area. Thus, the image forming apparatus 12 and 14 differ in handling the registration mark and the area in which the registration mark may be formed in the image forming apparatus 12 and the area in which the registration mark may be detected in the image forming apparatus 14 do not become the same.

The registration mark has the two modes: One in which the registration mark is formed on the side where the image forming apparatus 12 forms an image and the other in which the registration mark is formed on the back side of the side. The mode may be selected by setting operation as operation of a control panel described later.

The image forming apparatus 12 includes an operation panel 20. The operation panel 20 is a touch panel display and an interface for making various settings of the image forming apparatus 12 and operating the image forming apparatus 12. The image forming apparatus 14 includes an operation panel 21. The operation panel 21 is a touch panel display and an interface for making various settings of the image forming apparatus 14 and operating the image forming apparatus 14.

(Configuration of Control System)

Figure 2:
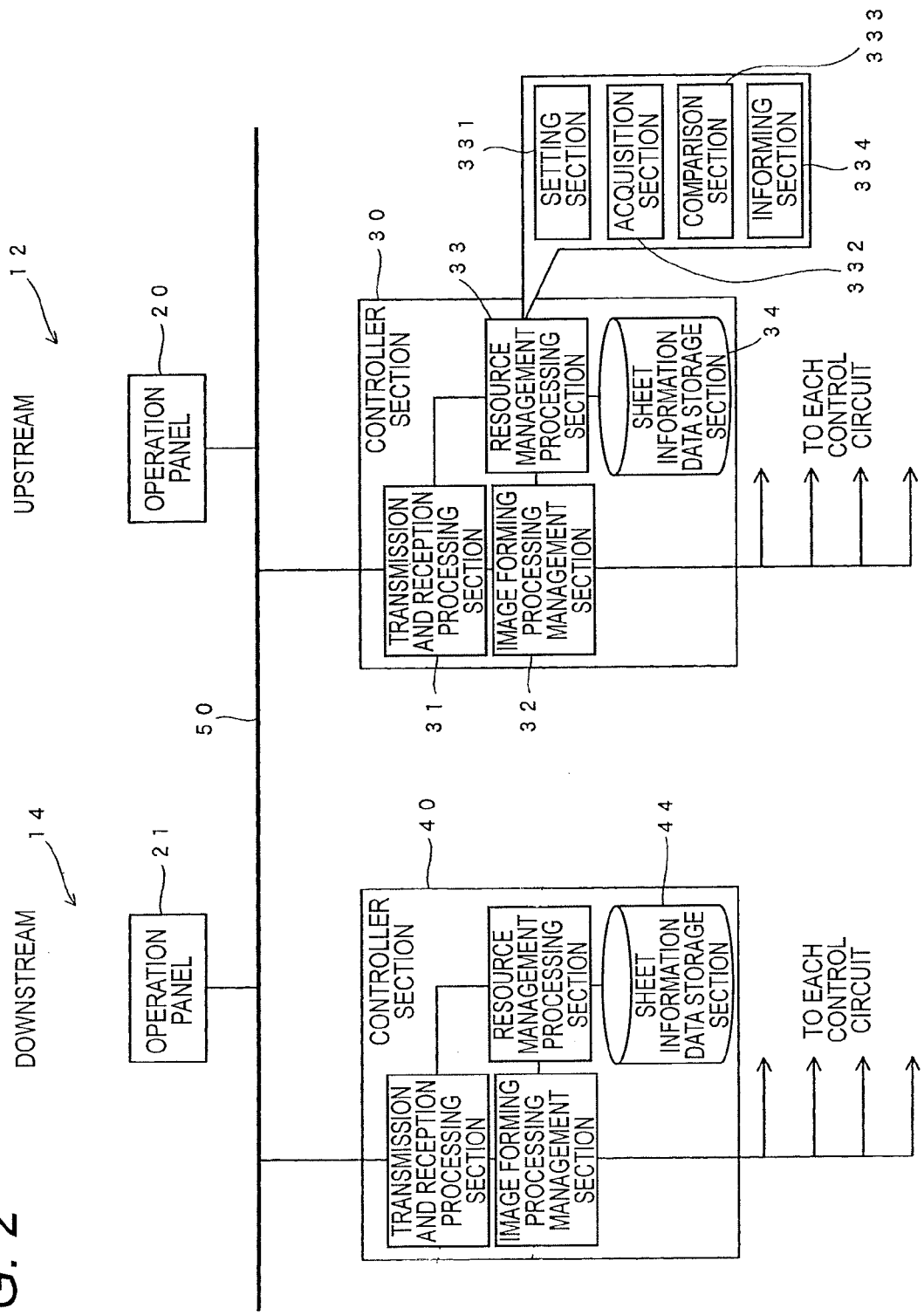
FIG. 2 is a block diagram of the cascade printing system of the exemplary embodiment of the invention.

FIG. 2 shows the configuration of a control system of the cascade printing system 10 as shown in FIG. 1. The image forming apparatus 12 includes a controller section 30, a transmission and reception processing section 31, an image forming processing management section 32, a resource management processing section 33, and a sheet information data storage section 34. The controller section 30 includes a function as a computer and has a function of controlling the operation of the image forming apparatus 12. The transmission and reception processing section 31 has a function of transmitting and receiving (namely, communicating) data to and from a controller section 40, the operation panel 20, and the operation panel 21 through a communication line 50 of a LAN, etc.

The image forming processing management section 32 manages the processing operation in the image forming apparatus 12 in the image forming operation. For example, the timing of exposure to the photoconductive drum, the transfer timing of a toner image, and the like are controlled by a control signal output from the image forming processing management section 32. The resource management processing section 33 manages sheet information concerning a continuous sheet, various set conditions, etc. The sheet information handled in the resource management processing section 33 also contains information concerning the area in which the above-described registration mark on a continuous sheet may be formed (may be detected). The resource management processing section 33 also executes processing described later with reference to FIG. 3. In the resource management processing section 33, a setting section 331 for performing various types of setting processing in FIG. 3, an acquisition section 332 for performing various types of acquisition processing, a comparison section 333 for making a comparison on which various determinations are based, and an informing section 334 for performing processing to perform informing processing are implemented as software.

The sheet information data storage section 34 stores sheet information handled by the resource management processing section 33. In addition, the controller section 30 includes a CPU, a memory area, and an interface function to function as a computer.

The controller section 40 includes a similar configuration to that of the controller section 30. However, since the image forming apparatus 12 and 14 are different models, fine control and handled data differ because of the model difference. However, the basic function of each function section is the same as that of the controller section 30 described above and therefore the controller section 40 will not be discussed.

(Operation Example)

Figure 3:
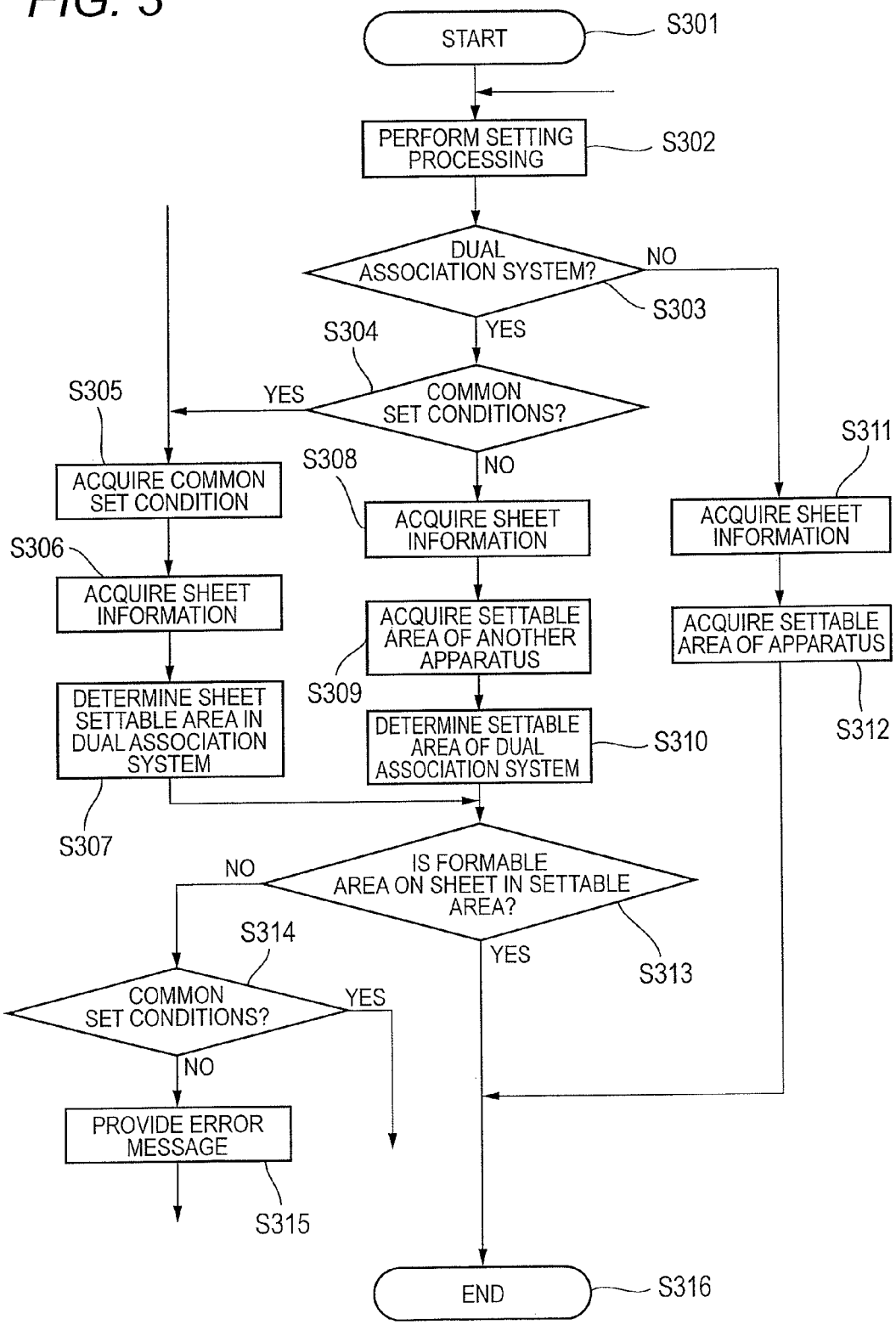
FIG. 3 is a flowchart to show an example of the operation of the exemplary embodiment of the invention.

An example of the operation of the configuration shown in FIG. 1 will be discussed. FIG. 3 is a flowchart to show an example of the operation. The flowchart of FIG. 3 is executed in the resource management processing section 33 of the controller section 30 of the image forming apparatus 12 placed upstream in the sheet convey path.

A program for executing the flowchart of FIG. 3 is stored in a memory area (for example, in a hard disk unit forming the sheet information data storage section 34) in the controller section 30 and is read to an appropriate memory area for execution. The program may be stored in a server or an appropriate storage medium and be provided therefrom.

To use the system in FIG. 1, the operation panel 20 or 21 is operated by an operator and various settings are made. In the system in FIG. 1, in operation control, the controller section 30 (see FIG. 2) of the upstream image forming apparatus 12 becomes the host and thus setting made by operating the operation panel 21 is sent to the controller section 30 through the communication line 50.

When operation of setting mentioned above is started (step S301), the setting operated by the operator is made (step S302). Next, whether or not the system is a dual association system is determined (step S303). If the system is a dual association system as shown in FIG. 1, the process goes to step S304; if the image forming apparatus is used singly, the process goes to step S311.

At step S304, whether or not setting operation of common set conditions is performed is determined. The common set conditions are conditions of settings which are previously provided and are stored in the sheet information data storage section 34 and may be used by the image forming apparatus 12 and 14 in common. The common set conditions contain a condition for setting a common area in which a registration mark may be formed in both apparatus. A plurality of common set conditions are previously provided considering models predicted in combination.

If setting operation of the common set conditions is performed at step S302, the process goes from step S304 to step S305 and the common set condition is acquired. At this time, one condition of candidates (for example, the highest one in the list) is selected and is acquired. After step S305, information concerning the continuous sheet to be used is acquired (step S306). The information concerning the continuous sheet contains information about the range in which a registration mark may be formed on the continuous sheet. Then, the area in which the registration mark may be formed (settable area) in the cascade printing system 10 in FIG. 1 is set based on the description acquired at step S305 (step S307) and the process goes to step S313 described later.

The process returns to step S304 and if the common set conditions are not set, the process goes to step S308. At step S308, information concerning the continuous sheet to be used is acquired and next, information of the area in which the registration mark may be detected (settable area) in the image forming apparatus 14 of another apparatus forming the cascade printing system 10 is acquired from the image forming apparatus 14 (S309). The area in which the registration mark may be formed (settable area) in the cascade printing system 10 is determined based on the acquired description (step S310).

For example, at step S310, a comparison is made between information of the area in which the registration mark may be formed, set by the operator and the range of the position of the registration mark that may be handled by the image forming apparatus 14 acquired from the image forming apparatus 14, and a common area is extracted therefrom and is set to the area in which the registration mark may be formed (settable area) in the cascade printing system 10.

The process returns to step S303 and if the system is a cascade printing system, information of the continuous sheet to be used is acquired (step S311) and next the area in which the registration mark may be formed (settable area) in the image forming apparatus (in this case, the image forming apparatus 12) is acquired (step S312) and the processing is terminated (step S316). This processing flow is the same as that of a usual image forming apparatus.

If step S307 or S310 is executed, the process goes to step S313. At step S313, a comparison is made between the range in which the registration mark may be formed on the continuous sheet obtained from the acquired information of the continuous sheet and the settable area (the area in which the registration mark may be formed, seen from the cascade printing system side) determined at step S307 or S310, and whether or not the former is contained in the latter is determined.

If the determination at step S313 is NO, the possibility that the positioning mark will not normally function occurs. If the positioning mark does not normally function, the function of registering the image position on the surface and the back of the continuous sheet.

At step S313, if the range in which the registration mark may be formed on the continuous sheet is contained in the area in which the registration mark may be formed (in the settable area) seen from the cascade printing system 10 side, the positioning mark functions effectively in the cascade printing system 10 and thus the processing is terminated (step S316).

On the other hand, at step S313, if the range in which the registration mark may be formed on the continuous sheet is not contained in the area in which the registration mark may be formed, seen from the cascade printing system 10 side, there is a possibility that a defective condition may occur in the double-sided print operation as described above and thus the process goes to step S314. At step S314, whether or not the common set conditions are set at step S302 is determined again as at step S304.

If the common set conditions are set, step S305 is again executed, an unselected common setting condition at this point in time is selected, and processing of step S306 and the later is repeated.

When the process goes from step S314 to step S305, if an unselected common setting condition does not exist, an error message of "common setting condition that may be used does not exist" or the like is provided (not shown in the figure) and the process returns to S302. In this case, setting is again made from the beginning.

If the common set conditions are not set at step S314, the process goes to step S315 and an error message is provided. At step S315, display to the effect that an error exists in the setting concerning the forming position of the registration mark is produced on the operation panel operated by the operator. If an error message is provided at step S315, the process returns to step S302 and setting is again made from the beginning.

(Priority)

When two image forming apparatus are used in combination, if an area in which a registration mark may be formed is set so that the registration mark functions in both the two apparatus, it does not match the range in which the registration mark may be formed on a used continuous sheet in some cases. In the embodiment, the matching is determined at step S313 and if the matching is not ensured, an error message is provided at step S315.

Accordingly, the operator is informed of occurrence of a defective condition that the registration mark does not effectively function and it is made possible for the operator, to grasp existence of a problem in setting of the registration mark.

That is, when different models of image forming apparatus are used in combination in the image forming system, whether or not there is a possibility that the registration mark will not effectively function is determined (step S313) and the user is informed of the determination result (step S315). Thus, fruitless print operation wherein double-sided printing is not effectively performed may be circumvented.

According to processing of step S304 and the later, preset setting that may be used in common in the image forming apparatus 12 and 14 is selected. Thus, if dual association connection of different models is made, two image forming apparatus are operatively associated and the operation in which the registration mark effectively functions may be set without performing intricate setting operation separately for each image forming apparatus.

(Another Processing Example)

Figure 4:
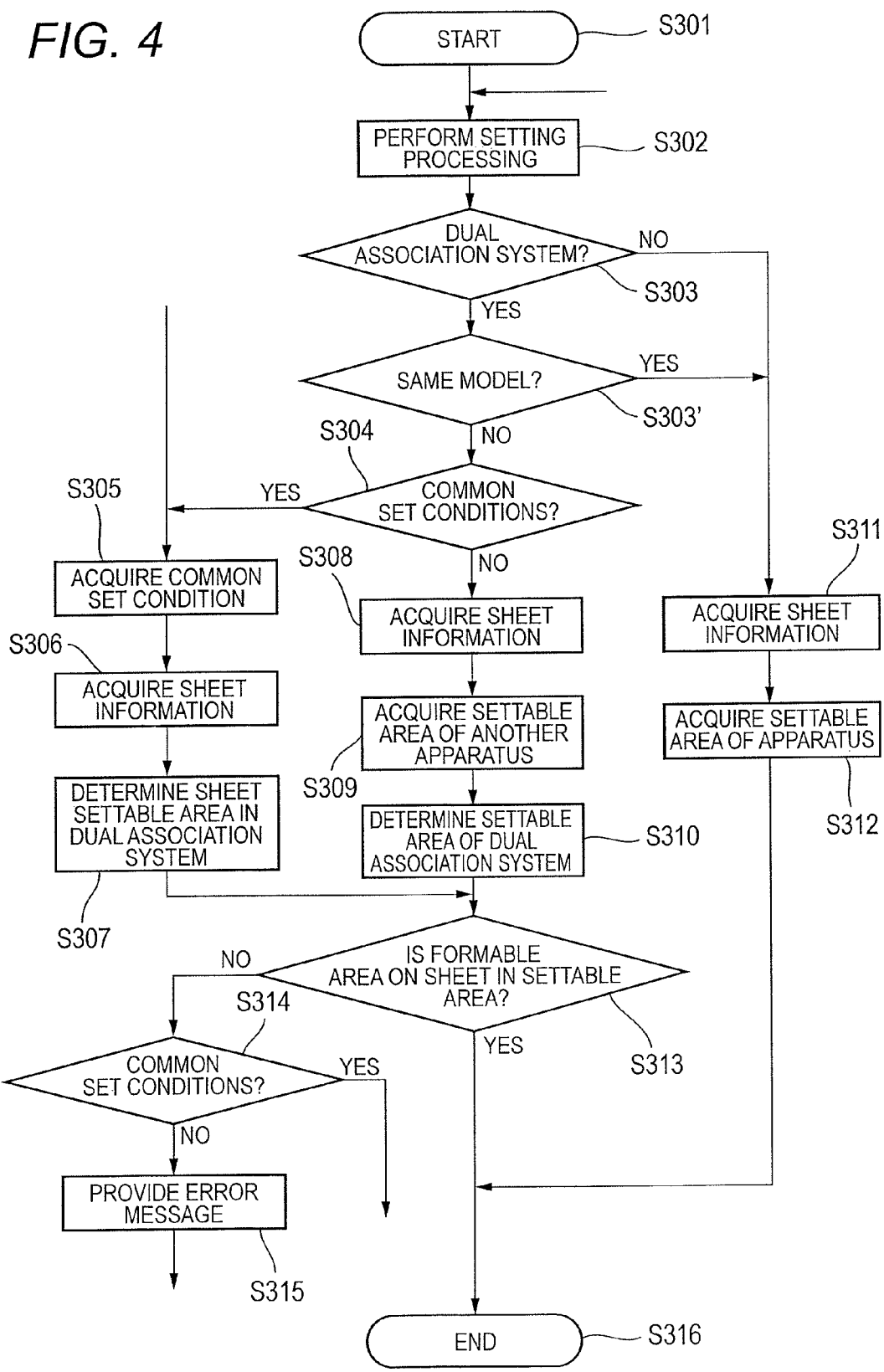
FIG. 4 is a flowchart to show an example of the operation of the exemplary embodiment of the invention.

FIG. 4 is a flowchart to show one of application examples of the processing in FIG. 3. In the processing in FIG. 4, after step S303, whether or not the two image forming apparatus making up the system are the same model is determined (step S303'). In the example, if the two image forming apparatus are the same model, the process goes to step S311; otherwise, the process goes to step S304. Others are the same as those in FIG. 3. According to the processing in FIG. 4, a dual association system using the same model may also be covered.

(Others)

Each common set condition may be provided for each combination pattern of models to be combined, table data may be stored, and the common set condition appropriate for the combined models may be selected from the table data.

As the functions of the registration mark, in addition to a mark used for registration at double-sided printing time, functions of informing the downstream image forming apparatus of position information in a continuous sheet such as a function of specifying the fold position, a function of specifying the position of staple processing, and a function of specifying the cut portion in postprocessing after image forming may be named. Any one or two or more of the functions may be used.

The common set conditions may be generated based on internal information of the image forming apparatus 12 and 14. In this case, the resource management processing section 33 performs the following processing: First, the resource management processing section 33 acquires information concerning the area in which a registration mark may be formed in the image forming apparatus 12 from the sheet information data storage section 34 and further acquires information concerning the area in which the registration mark may be detected in the image forming apparatus 14 from sheet information data storage section 44. A common area in the two areas is extracted and is adopted as the common setting condition.

INDUSTRIAL APPLICABILITY

The invention may be used for the art of forming an image on a continuous record medium using image forming apparatus of different models.

The foregoing description of the exemplary embodiment of the present invention has been provided for the purpose of illustration and description. It is not intended to be exhaustive or to limit the invention to the precise forms disclosed. Obviously, many modifications and various will be apparent to practitioners skilled in the art. The embodiments were chosen and described in order to best explain the principles of the invention and its practical application, thereby enabling other skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   a first acquiring unit that acquires first settable region information on a plane-shaped recording medium in other image forming apparatus, the first settable region information indicating a first settable region on which a registration mark is settable;
   a determination unit that determines a first region based on the first settable region information, the first region being a region on which the registration mark is formable in a cascade printing system including the image forming apparatus and the other image forming apparatus;
   a second acquiring unit that acquires second settable region information on the plane-shaped recording medium, the second settable region information indicating a second settable region on which the registration mark is formable in the plane-shaped recording medium; and
   an notifying unit that provides, when the second settable region is not involved in the first region, invalidity information indicating the registration mark is possible invalid.

2. The image forming apparatus according to claim 1 further comprising a storage unit that stores information of the first region used in common in the image forming apparatus and the other image forming apparatus.

3. An image forming apparatus comprising:
   an image forming processing management unit that manages image forming processing on a first side of a plane-shaped record medium;
   a communication unit that establish a communication between the image forming apparatus and the other image forming apparatus configured to form an image on a second side of the plane-shaped recording medium, a model of the image forming apparatus being different from a model of the other image forming apparatus;
   a first acquiring unit that acquires first settable region information on the plane-shaped recording medium in the other image forming apparatus, the first settable region information indicating a first settable region on which a registration mark is settable;
   a determination unit that determines a first region based on the first settable region information, the first region being a region on which the registration mark is formable in a cascade printing system including the image forming apparatus and the other image forming apparatus;
   a second acquiring unit that acquires second settable region information on the plane-shaped recording medium, the second settable region information indicating a second settable region on which the registration mark is formable in the plane-shaped recording medium; and
   a comparison unit that compare the first region with the second settable region.

4. The image forming apparatus according to claim 3 further comprising an notifying unit that provide, when the second settable region is not involved in the first region, invalidity information indicating the registration mark is possible invalid.

5. The image forming apparatus according to claim 3 further comprising a storage unit that stores information of the first region used in common in the image forming apparatus and the other image forming apparatus.

6. A computer readable medium storing a program causing a computer to execute a process for image formation in a cascade printing system including an image forming apparatus and other image forming apparatus, the process comprising:
   acquiring first settable region information on a plane-shaped recording medium in the other image forming apparatus, the first settable region information indicating a first settable region on which a registration mark is settable;
   determining a first region based on the first settable region information, the first region being a region on which the registration mark is formable in the cascade printing system;
   acquiring second settable region information on the plane-shaped recording medium, the second settable region information indicating a second settable region on which the registration mark is formable in the plane-shaped recording medium; and
   providing, when the second settable region is not involved in the first region, invalidity information indicating the registration mark is possible invalid.

* * * * *